UNITED STATES PATENT OFFICE.

FRANCIS C. NICHOLAS, OF WASHINGTON, DISTRICT OF COLUMBIA, ASSIGNOR TO JAMES H. S. BATES, OF HOBOKEN, NEW JERSEY.

COMPOSITION OF MATTER TO BE USED IN REVITALIZING SOILS.

1,099,151.   Specification of Letters Patent.   Patented June 2, 1914.

No Drawing.   Application filed February 27, 1912.   Serial No. 680,354.

*To all whom it may concern:*

Be it known that I, FRANCIS C. NICHOLAS, a citizen of the United States, residing in Washington, District of Columbia, have invented a new and useful Composition of Matter to be Used in Revitalizing Soils.

My composition consists of: calcium sulfate, four parts, bitumen, one part, potassium silicates, eight parts, phosphate rock, four parts.

While a formula is given, the reaction of the materials is not wholly dependent on this formula, and the use of bitumen, calcium sulfate, potassium containing silicates and phosphate rock for revitalizing soils, I claim as my invention and discovery.

I believe my composition to be different and distinct from any heretofore patented as a fertilizer and revitalizer of soils in that it is a fertilizer composed of and including a potassium bearing silicate, a phosphorus bearing mineral, a bitumen bearing mineral and calcium sulfate, all being finely divided and mingled together, which, through their reactions one on the other, beginning with the liberation of carbon for the enrichment of carbonic acid or atmospheric waters, and ending with the liberation of potassium, phosphorus and silica in a form available for assimilation by plant life.

To use the material it is simply necessary to scatter it roughly over the land, the soil of which is to be revitalized.

I claim—

A fertilizer composition including a potassium bearing silicate, a phosphorus bearing mineral, a bitumen bearing mineral and calcium sulfate, all being finely divided and mingled together.

FRANCIS C. NICHOLAS. [L. S.]

Witnesses:
L. M. Fox,
ROSE HERBERT.